United States Patent [19]

Volk

[11] Patent Number: 4,590,704
[45] Date of Patent: May 27, 1986

[54] TRAPPING APPARATUS

[75] Inventor: Seymour A. Volk, Broadus, Mont.

[73] Assignees: Charley Carl Emmons; Barry L. Emmons, both of Olive, Mont.; part interest to each

[21] Appl. No.: 555,600

[22] Filed: Nov. 28, 1983

[51] Int. Cl.$^4$ .............................................. A01M 23/02
[52] U.S. Cl. ............................................ 43/61; 43/60
[58] Field of Search .................... 43/61, 58, 60, 69, 70, 43/71, 72

[56] References Cited

U.S. PATENT DOCUMENTS

| 166,802 | 8/1875 | Oliver | 43/61 |
|---|---|---|---|
| 2,616,210 | 11/1952 | Reeb | 43/61 |
| 2,692,453 | 10/1954 | Wingfield | 43/61 |
| 3,348,331 | 10/1967 | Williams | 43/61 |
| 3,394,487 | 7/1968 | Wood et al. | 43/61 |
| 3,834,063 | 9/1974 | Souza et al. | 43/61 |
| 3,913,258 | 10/1975 | Souza et al. | 43/61 |

Primary Examiner—Nicholas P. Godici
Assistant Examiner—Kurt Rowan
Attorney, Agent, or Firm—Arthur L. Urban

[57] ABSTRACT

Trapping apparatus including a cage portion, a door portion, a door actuating portion and a door locking portion; the cage portion having a generally box shaped configuration with bottom, top, sidewall, and end sections and an end opening; the door portion being pivotally connected to the cage portion along an edge of the cage opening; the door actuating portion including a trigger section disposed within the cage portion and being pivotally connected between the sidewall sections of the cage portion along a line remote from the door portion, connecting mechanism extending from the trigger section to a point adjacent the cage opening, the connecting mechanism including a connector section extending upwardly from the trigger section to a rotatable rod member pivotally connected thereto that extends along the top section to a point adjacent the cage opening, a finger section extending from the free end of the rod member adjacent the cage opening, a finger engaging section extending substantially perpendicularly from the door portion adjacent the finger section of the rod member; the door locking portion including at least a first bar member disposed adjacent a vertical edge of the cage opening, a second bar member affixed along an edge of the door portion adjacent and substantially parallel to the first bar member when the door portion is disposed over the cage opening, mechanism jointly engaging the first and second bar members slidable therealong from the top section to the bottom section.

13 Claims, 4 Drawing Figures

U.S. Patent May 27, 1986 4,590,704
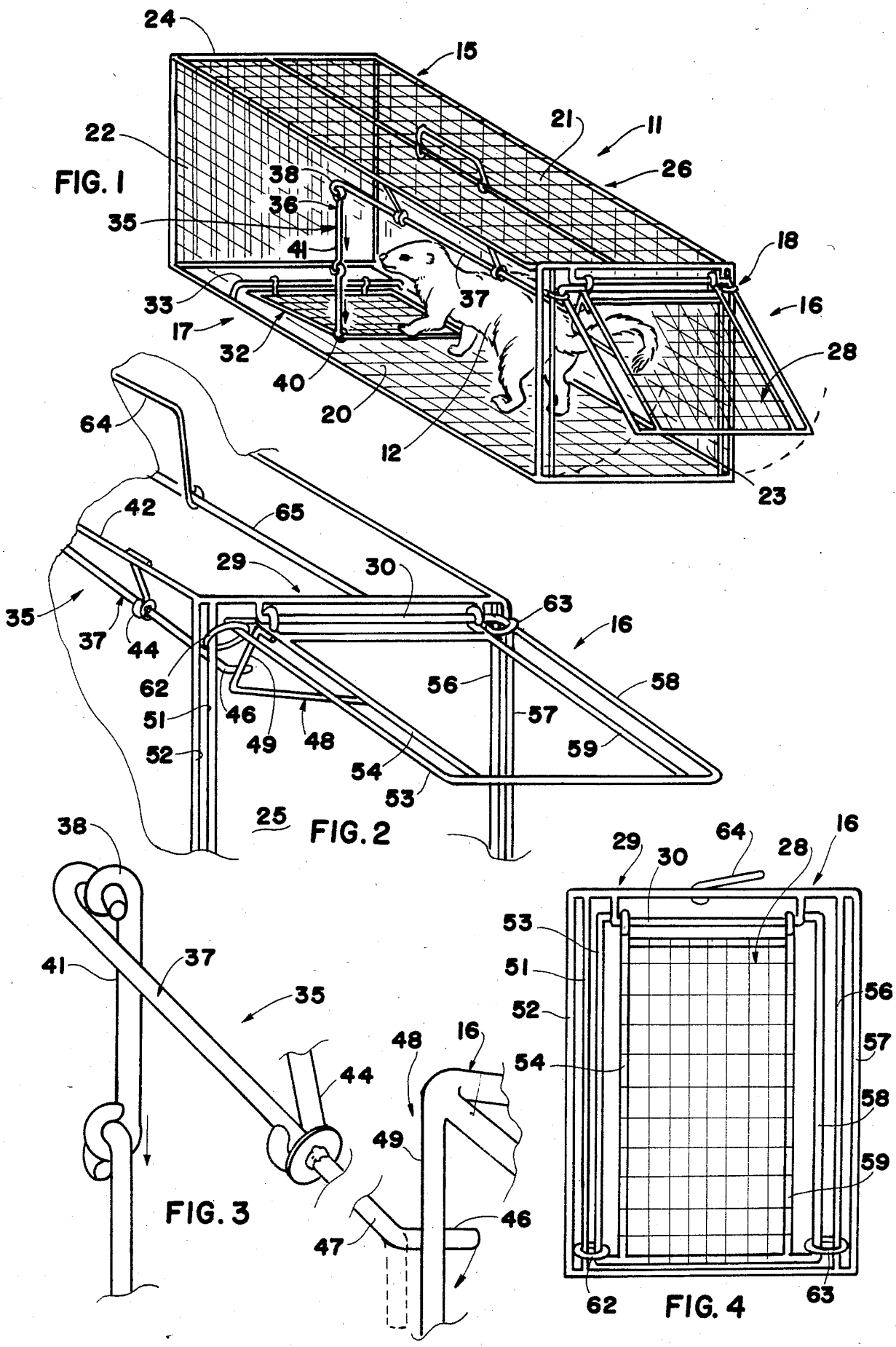

TRAPPING APPARATUS

This invention relates to a novel trapping apparatus and more particularly relates to a new apparatus for trapping animals.

Throughout history, wild animals have been trapped for a variety of purposes. Animals were trapped for food, for their pelts, to be trained and the like. Originally, traps were individually constructed by the user. However, as the use of traps became more popular, businesses were started to manufacture and sell traps.

Traps are of two principal types. One is the jaw trap which includes movable jaws that clamp around the leg of an animal when the animal steps on a trigger. The trap holds the animal until the trapper releases it. These traps are considered objectionable for several reasons. Animals caught in them are believed to suffer intense pain until they finally die or are killed by the trapper. Also, the captured animal may knaw at the leg caught by the jaws until it can sever the leg and escape. Even if the trapped animal cannot escape it still may become the prey of another animal in the area.

Because of the objections to and shortcomings of jaw traps, a second type of trap, namely, a cage trap, has become more widely used. Cage traps employ a cage with a closable door. The door is held in an open position until an animal walks into the cage and steps on a trigger located toward the rear of the cage. The door falls into a closed position and is locked.

While cage traps capture an animal without harming it, and thus are considered more humane, the traps are not without their own deficiencies. Some traps include doors that occupy a significant portion of the space within the cage when in a locked position. As a result, such traps must have larger cages than required for the animal in order to accommodate the closed door.

Many cage traps employ hinge and trigger mechanisms that protrude outside the cage. This may result in accidental triggering of the trap by a passing animal or other distrubance.

In addition, some cage traps include trigger mechanisms that are difficult to set or may cause harm to the user or the trapped animal. Other traps have locking mechanisms that may not function properly in adverse weather or may be opened by the thrashing of an animal inside the cage.

Another deficiency of some cage traps is the difficulty encountered in releasing an unwanted animal such as a skunk. It may be necessary for the trapper to be close to the cage in order to open the door. This proximity may result in a trapper being sprayed by a skunk in order to release the animal and recover his trap for future use.

It is clear from the above discussion that previous traps have not provided satisfactory results in a significant number of trapping conditions. Thus, there is a need for a new trap that overcomes the deficiencies of earlier traps.

The present invention provides a novel trapping apparatus with features and advantages not found in previous traps. The trapping apparatus of the invention includes a trigger mechanism that is totally contained within the trap cage. Since no protrusions extend outside the apparatus, accidental triggering is minimized. The triggering mechanism also does not include any springs or latches that may injure the trapper or an animal.

The door locking mechanism of the trapping apparatus of the present invention functions automatically immediately upon activation of the trigger. The door locks provides a positive locking of the door to prevent accidental opening of the door and release of the trapped animal. However, the lock and door can be released easily from a distance if it is necessary to release an unwanted animal and thus avoid spraying or injury.

The door and lock mechanisms do not infringe on the space within the cage so larger animals can be captured with smaller size cages. The bulk that the trapper must move when changing the location of the trap thus is reduced. This construction allows the trapping apparatus to function also as a convenient animal carrier.

The trapping apparatus of the present invention is simple in design and can be produced relatively inexpensively. The trap can be fabricated from commercially available materials and components. Conventional trap manufacturing techniques and procedures can be employed in its fabrication. The apparatus is durable in construction and has a long useful life. Little, if any maintenance is required to keep the trap in working condition.

The trapping apparatus of the invention can be used efficiently by trappers after only a minimum of instruction. The trap can be utilized conveniently by persons of all ages including youngsters and the elderly. The trap can be set quickly and easily. The triggering mechanism may be adjusted to function properly with different size animals. The traps can be used to capture small animals such as chipmunks as well as large animals such as mountain lions. The trap can be used safely around domestic animals without fear of injury to them. The design of the traps allows them to be stacked or nested.

These and other benefits and advantages of the novel trapping apparatus of the present invention will be apparent from the following description and the accompanying drawings in which:

FIG. 1 is a view in perspective of one form of the trapping apparatus of the invention with an animal activating the trigger section;

FIG. 2 is an enlarged fragmentary view of the trapping apparatus shown in FIG. 1 with the door portion in a set position;

FIG. 3 is a further enlarged fragmentary view of the trapping apparatus shown in FIGS. 1 and 2 as the door actuating portion is activated; and FIG. 4 is a front view of the trapping apparatus of FIGS. 1 and 2 with the door portion locked.

As shown in the drawings, one form of the novel trapping apparatus 11 of the present invention is shown with an animal 12 activating the apparatus. The trapping apparatus 11 includes a cage portion 15, a door portion 16, a door actuating portion 17 and a door locking portion 18.

The cage portion 15 of the trapping apparatus 11 has a generally box shaped configuration. The cage portion includes a bottom section 20, a top section 21 and sidewall sections 22 and 23 that extend between the bottom and top sections. The cage portion also includes an end section 24 extending between the sidewall sections and an opening 25 at the opposite end of the rectangular cage portion.

Advantageously, the cage portion 15 includes at least one wire panel 26 and preferably is completely formed of wire panels. The length of the sidewall sections 22 and 23 advantageously is substantially greater than the width of the cage opening 25.

The door portion 16 of the trapping apparatus 11 includes a wall section 28. The wall section 28 is pivotally connected to the cage portion 15 along an edge 29 of the cage opening 25. The door portion 16 preferably is connected to the cage portion through a bar member 30 disposed adjacent the top section edge 29.

The door actuating portion 17 of the trapping apparatus 11 includes a trigger section 32 disposed within the cage portion 15. The trigger section 32 is normally spaced above the bottom section 20. Trigger section 32 is pivotally connected between the sidewall sections 22 and 23 along a line or shaft 33 remote from the door portion 16. The shaft 33 of the trigger section is oriented substantially parallel to the bottom section 20.

The trigger section 32 advantageously is normally disposed generally parallel to the bottom section. Preferably, the trigger section extends across substantially the full width of the cage portion 15. It is desirable for the trigger to have a generally rectangular configuration and preferably includes a wire panel.

The door actuating portion 17 also includes connecting means 35 that extends from the trigger section 32 to a point adjacent the cage opening 25. The connecting means 35 includes a connector section 36 extending upwardly from the trigger section. Further, a rotatable rod member 37 that extends along top section 21 to a point adjacent the cage opening 25 is pivotally connected to the upper end 38 of the connector section.

Advantageously, connector section 36 is pivotally connected to the trigger section 32 adjacent a corner 40 thereof. The connector section preferably includes a rod member 41 pivotally connected between the rod member 37 and the trigger section 32. Rod member 37 advantageously is disposed inside the cage portion 15 adjacent an upper corner edge 42 thereof. Preferably, the rod member 37 is supported closely adjacent the top section 21 on brackets 44.

A finger section 46 extends from the free end 47 of the rod member 37 adjacent the cage opening 25. The finger section 46 advantageously extends from the rod member 37 substantially perpendicular thereto.

A finger engaging section 48 extends from the door portion 16 substantially perpendicular thereto. The finger engaging section extends from the door portion adjacent the finger section 46 of the rod member 37. Preferably, the finger engaging section 48 includes a section 49 substantially perpendicular to a vertical edge 54 of the door portion 16.

The door locking portion 18 of the trapping apparatus 11 of the invention includes at least a first bar member 51 disposed adjacent a vertical edge 52 of the cage opening 25. The door locking portion 18 also includes a second bar member 55 affixed along an edge 54 of the door portion 16. This second bar member 53 is disposed adjacent and substantially parallel to the first bar member 51 when the door portion 16 is positioned over the cage opening 25.

Advantageously, first bar members 51 and 56 are disposed adjacent to each of the vertical edges 52 and 57 of the cage opening with second bar members 53 and 58 affixed along opposite edges 54 and 59 of the door portion, the second bar members being capable of orientation adjacent to each of the first bar members.

The door locking portion 18 further includes means 61 shown as ring 62 that jointly engages an adjacent pair of first and second bar members 51 and 53 along one edge 52 of the cage opening 25. Similarly, when a second pair of first and second bar members 56 and 58 are employed along the opposite edge 57 of the cage opening, a second ring 63 jointly engages this pair of bar members.

The engaging rings 62 and 63 are slidable along the respective pair of first and second bar members from a point adjacent the top section 21 to a point adjacent the bottom section 20. Thus, the rings slide from the pivoting top of the door portion 16 down to the lower free edge thereof to lock the position thereof. Preferably, the rings are substantially continuous ring members.

The trapping apparatus 11 also advantageously includes handle means 64. The handle 64 preferably is pivotally connected to a support member 65 that extends between edges of the top section 21. This construction allows the handle to be positioned against the top section when not needed.

In the use of the trapping apparatus 11 of the present invention, the appartus is carried into the field by grasping handle 64. When the desired trapping location is found, the apparatus is placed on the ground and the handle rotated out of the way against the top section 21.

The trapping apparatus 11 is set by sliding the rings 62 and 63 upwardly along the pair of rod members 51 and 53 and also along rods 56 and 58. When the rings reach the top of the door portion 16, the free end of the door can be swung upwardly until the door is in a substantially horizontal position as shown in FIG. 2.

While holding the door open with the right hand, the triggering or door actuating portion 17 is set with the other hand. This involves raising the trigger section 32 so rod member 37 connected thereto through connector section 36 rotates to place finger section 46 in a position behind the finger engaging section 48 that extends from the door. The door then is released so finger engaging section 48 rests against the finger section 46.

Next, bait is placed on the trigger section 32 and the trap positioned. It can be camouflaged if desired with leaves, shrubbery, etc.

When an animal that is attracted to the bait enters the trap through cage opening 25, it moves toward the bait and steps on the trigger section 32. This action causes the trigger section to pivot downwardly on shaft 33 and draws connector section 36 with it. This downward movement of the connector section rotates rod member 37 that extends along the top corner of the cage toward the cage opening 25. The rotation causes the finger section 46 at the free end of the rod member to turn downwardly out of engagement with the finger engaging section 48 extending from the door portion. When the finger section has moved away from the finger engaging section, the door portion 16 falls downwardly into a closed position.

While the door was open, rings 62 and 63 have been restrained along the upper edges of the door by the divergence of the pairs of rod members 51/53 and 56/58 along the edges of the door and the cage opening respectively. Now with the closing of the door, the rod members move together into aligned parallel positions which allow the rings to slide downwardly along the rod members to a position along the bottom edge of the door. This causes the door to be securely held in a locked position by the rings 62 and 63 with the animal inside the cage portion 15.

When the trapper returns to check the trap, he can remove the animal easily by simply raising the rings so the door will be released for upward movement to an open position.

If a captured animal such as a skunk is not wanted, it can be released from a distance by turning the trap over with a long pole. When the trap is inverted, the rings 62 and 63 automatically slide downwardly back to the hinge area of the door. This action unlocks the door so gravity will cause the door to fall open. The unwanted animal then can retreat through the opening 25. All of this takes place while the trapper is at a safe distance from the animal.

The trapping apparatus 11 can be reset or taken to a different location for further trapping. When the trapping season is over, the trapper can stack the traps in a compact storage area and/or can nest smaller traps inside the larger ones to reduce the storage area required.

The trapping apparatus of the present invention can be fabricated from a variety of different materials including metals, wood, plastics and combinations thereof. Advantageously, the apparatus is formed with a steel rod frame and wire mesh panels. The size of the trapping apparatus will depend upon the size of the animal being trapped and vary from small traps for chipmunks, squirrels, etc. to larger sizes for mountain lions and the like.

The above description and the accompanying drawings show that the present invention provides a novel trapping apparatus with features and advantages not found in previous traps. The trapping apparatus includes unique triggering and locking assemblies. The triggering portion is contained totally within the trap cage to greatly reduce accidental triggering. The locking portion functions automatically to provide a positive escape proof lock for the door, which lock however can be easily released even from a distance. Also, the door portion does not infringe on the cage space so the overall dimensions can be minimized.

The trapping apparatus of the invention is simple in design and relatively inexpensive. Commercially available materials and components and conventional trap building techniques can be utilized in its fabrication. The trap is durable in construction and requires little maintenance.

The trapping apparatus can be used efficiently by persons of all ages after a minimum of instruction. The trap can be used safely around domestic animals without fear of injury to them.

It will be apparent that various modifications can be made in the particular trapping apparatus described in detail above and shown in the drawings within the scope of the invention. The size, configuration and arrangement of components can be different to meet specific requirements. These and other changes can be made in the trapping apparatus provided the functioning and operation thereof are not adversely affected. Therefore, the scope of the present invention is to be limited only by the following claims.

What is claimed is:

1. Trapping apparatus including a cage portion, a door portion, a door actuating portion and a door locking portion; said cage portion having a generally box shaped configuration, said cage portion including a bottom section, a top section, sidewall sections extending between said bottom and top sections, an end section extending between said sidewall sections and an opening at the opposite end of said cage portion; said door portion including an outwardly opening wall section, said wall section being pivotally and freely connected to said cage portion along a top edge of said cage opening; said door actuating portion including a trigger section disposed within said cage portion, said trigger section being normally spaced above said bottom section, said trigger section being pivotally connected between said sidewall sections of said cage portion along a line remote from said door portion and substantially parallel to said bottom section, connecting means extending from said trigger section to a point adjacent said cage opening, said connecting means including a connector section extending upwardly from said trigger section, a rotatable rod member pivotally connected to an upper end of said connector section and extending along said top section to a point adjacent said cage opening, said rotatable rod member being supported inside said cage portion closely adjacent an upper corner edge thereof, a finger section extending substantially perpendicularly from the free end of said rod member adjacent said cage opening, a finger engaging section extending substantially perpendicularly from the top of a vertical edge of said door portion adjacent said finger section of said rod member, a diagonal support extending from a free end of said finger engaging section back to said vertical edge of said door portion, said finger engaging section and said diagonal support being disposed completely within said cage portion when said door portion is closed; said door locking portion including at least a first bar member disposed adjacent a vertical edge of said cage opening, a second bar member affixed along an edge of said door portion adjacent and substantially parallel to said first bar member when said door portion is disposed over said cage opening, means independently disposed along each vertical edge of said door portion engaging each pair of said first and second bar members, said engaging means including a pair of substantially continuous ring members with one being slidable along each pair of said first and second bar members from a point adjacent said top section to a point adjacent said bottom section and back to said top section; whereby said door portion can be releasably set in an open position and closed and locked automatically by applying pressure to said trigger section to activate said door actuating portion so said finger section is moved from a horizontal to a vertical position enabling said finger engaging section and said door portion from which it extends to move past said finger section into a closed position and said door portion can be unlocked and opened automatically by inverting said apparatus.

2. Trapping apparatus according to claim 1 wherein said cage portion includes at least one wire panel.

3. Trapping apparatus according to claim 1 wherein said cage portion is completely formed of wire panels.

4. Trapping apparatus according to claim 1 wherein the length of said sidewall sections is substantially greater than the width of said cage opening.

5. Trapping apparatus according to claim 1 wherein said door portion is pivotally connected to said cage portion through a bar member disposed adjacent a top section edge thereof.

6. Trapping apparatus according to claim 1 wherein said trigger section of said door actuating portion is normally disposed generally parallel to said bottom section.

7. Trapping apparatus according to claim 1 wherein said trigger section extends across substantially the full width of said cage portion.

8. Trapping apparatus according to claim 1 wherein said trigger section has a generally rectangular configuration.

9. Trapping apparatus according to claim 1 wherein said trigger section includes a wire panel.

10. Trapping apparatus according to claim 1 wherein said connector section is pivotally connected to said trigger section adjacent a corner thereof.

11. Trapping apparatus according to claim 1 wherein said connector section includes a rod member pivotally connected between said rotatable rod member and said trigger section.

12. Trapping apparatus according to claim 1 including a pair of engaging means.

13. Trapping apparatus according to claim 1 including a carrying handle means.

* * * * *